Feb. 7, 1961
E. M. BLATTNER
2,970,703
RUBBER DRAFT GEAR
Filed March 4, 1959
2 Sheets-Sheet 1
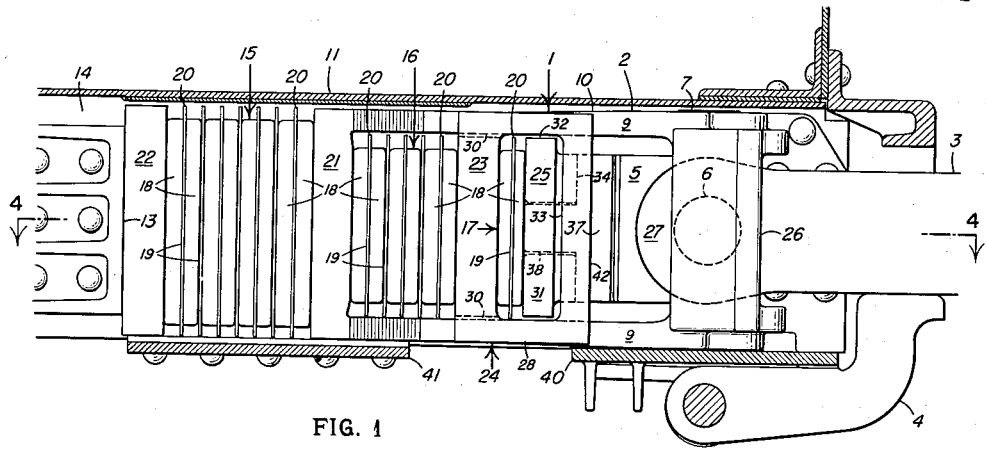
FIG. 1
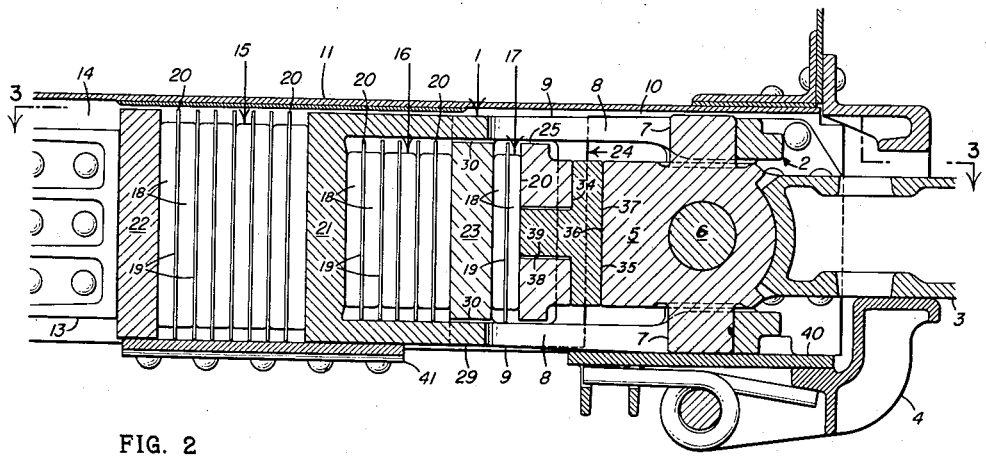
FIG. 2
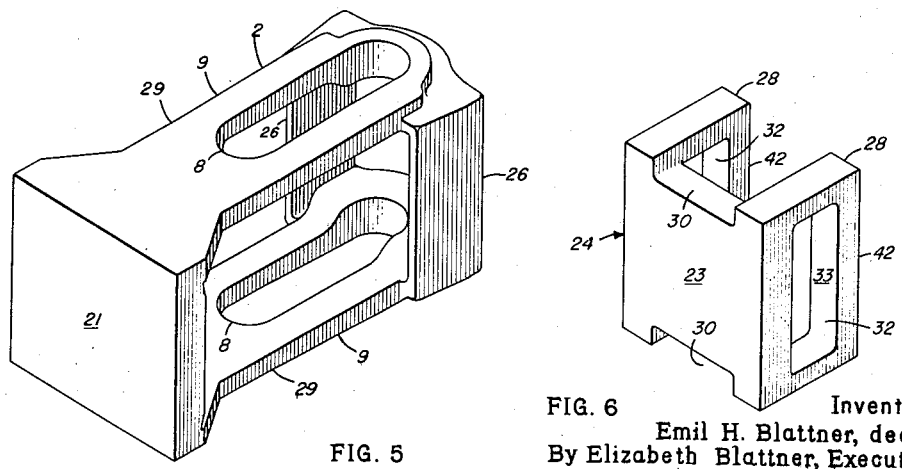
FIG. 5
FIG. 6
Inventor:
Emil H. Blattner, dec'd.
By Elizabeth Blattner, Executrix
By Wilmer Mechlin
his Attorney Feb. 7, 1961   E. M. BLATTNER   2,970,703
RUBBER DRAFT GEAR
Filed March 4, 1959   2 Sheets-Sheet 2

Inventor:
Emil H. Blattner, dec'd.
By Elizabeth Blattner, Executrix

By *Wilmer Mechlin*
his Attorney

United States Patent Office 2,970,703
Patented Feb. 7, 1961

2,970,703
RUBBER DRAFT GEAR

Emil H. Blattner, deceased, late of Williamsville, N.Y., by Elizabeth Blattner, executrix, Rochester, N.Y., assignor to Symington Wayne Corporation, Salisbury, Md., a corporation of Maryland Filed Mar. 4, 1959, Ser. No. 797,151

12 Claims. (Cl. 213—46)

This invention relates to rubber draft gears and has for its primary object to provide a rubber draft gear of the selective travel type which, by automatically compensating for wear, eliminates any slack which might otherwise develop between the draft gear and its pocket.

Another object of the invention is to provide an improved rubber draft gear of the selective travel type which eliminates slack not only between the gear and its pocket but between its front follower and the associated coupler.

An additional object of the invention is to provide a rubber draft gear having a multiplicity of rubber cushioning units, less than all of which are within its yoke and act in draft, but all of which act in buff by reason of a connection permitting the associated coupler to move rearwardly relative to the yoke and which together cooperate to eliminate slack by compensating for wear.

Other objects and advantages of the invention will appear hereinafter in the detailed description, be particularly pointed out in the appended claims and be illustrated in the accompanying drawings, in which:

Figure 1 is a side elevational view of a preferred embodiment of the rubber draft gear of the present invention with portions of the associated structure broken away and shown in section to more clearly illustrate certain of the details of construction.

Figure 2 is a vertical sectional view of the gear of Figure 1 taken along the lines 2—2 of Figure 3;

Figures 5, 6, 7 and 8 are isometric views, respectively, of the yoke, intermediate follower, front follower and bearing block of the preferred gear.

Figure 3:
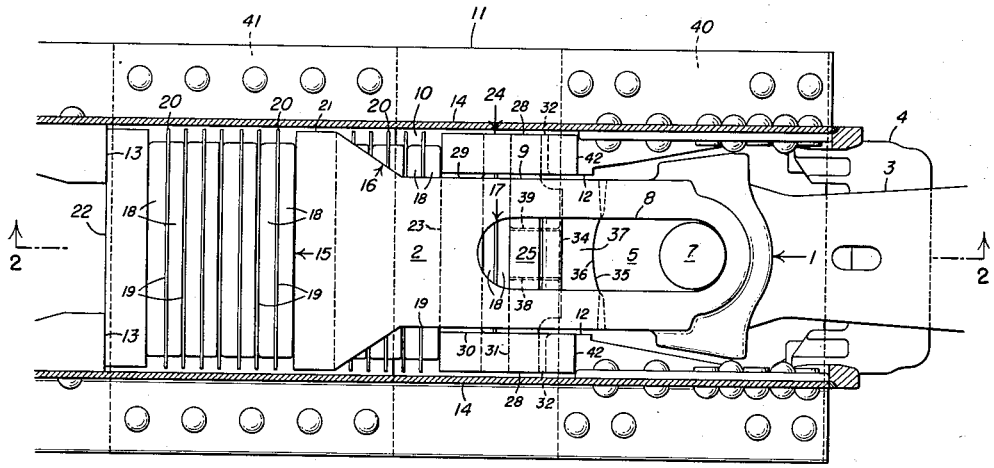
Figure 3 is a horizontal sectional view taken along the lines 3—3 of Figure 2.
Figure 4:
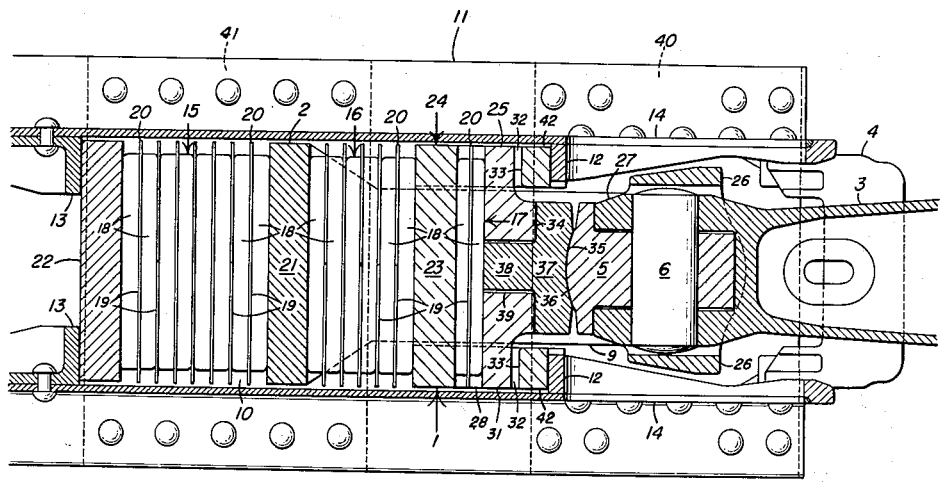
Figure 4 is a vertical sectional view taken along the lines 4—4 of Figure 1.
Figure 7:
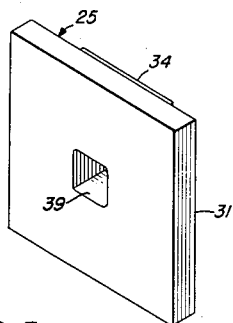
Figure 8:
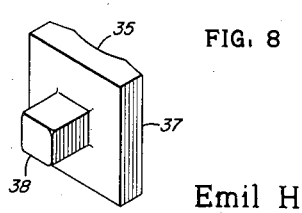

Referring now in detail to the drawings, in which like reference characters designate like parts, the improved rubber draft gear of the present invention designated as 1 is applicable generally for installations calling for a rubber draft gear having a plurality of cushioning units acting selectively in buff and draft. In any case having a yoke 2 connected to an associated coupler, the draft gear 1 of the illustrated embodiment is applied to a coupler 3 which is supported on a resilient coupler carrier 4. The exemplary coupler 3 is connected for relative universal angling to the yoke 2 through a universal block 5 connected by a pivot pin 6 to the coupler and by trunnions or pins 7 normal to and having a common axis intersecting that of the pivot pin, the trunnions preferably seating or being received in rearwardly elongated slots 8 in the straddling arms 9 of the yoke so that the coupler has a pin and slot connection with and can move rearwardly relative to the yoke under buffing forces.

Pocketed or seated in a draft gear pocket 10 in the center sill 11 of a railway vehicle (not shown) and transmitting longitudinal forces to the center sill through conventional front and rear stop lugs 12 and 13, respectively, fixed to the side walls 14 of the center sill at opposite ends of the pocket, the draft gear 1 is comprised, in addition to the yoke 2, of a multiplicity of rubber cushioning units arranged in tandem, one a rear unit 15, the second an intermediate unit 16, and the third a front or forward unit 17. In accordance with usual practice, each of the illustrated cushioning units 15, 16 and 17 is formed of alternating rubber pads 18 and metal plates 19, the preferred units having their rubber pads connected in pairs through the intervening plate to form rubber springs 20, with the remaining plates, if any, serving as spacers between adjoining springs. Of the several rubber cushioning units, the rear unit 15 is disposed rearwardly of the yoke 2 and is interposed between or longitudinally spaces and bears at opposite longitudinal ends against the transverse rear wall 21 of the yoke and a rear follower block 22, the latter in turn bearing against the rear stop lugs 13. The intermediate rubber cushioning unit 16 is within the yoke 2 and interposed between and longitudinally spaces or bears at opposite longitudinal ends against the yoke's rear wall 21 and a transverse or cross wall 23 of an intermediate follower 24. In its turn, the front rubber cushioning unit 17 is interposed between and longitudinally spaces or bears against confronting faces of the cross wall 23 of the intermediate follower 24 and a front follower block 25.

With its rear wall 21 disposed longitudinally between and spaced from the front and rear stop lugs 12 and 13, the yoke 2 which, in the illustrated embodiment, is of the vertical hooded type, has its arms 9 projecting or extending forwardly from opposite sides of its rear wall beyond the front stop lugs 12. Transversely or, for the illustrated vertical yoke, vertically spaced and preferably substantially parallel, the yoke arms 9 are here connected adjacent their forward ends by horizontally spaced webs 26 which, with the arms, surround the butt portion 27 of the associated coupler 3. The intermediate follower 24 also has a pair of transversely spaced arms 28 extending forwardly from opposite sides of its cross wall or rear 23 but these arms are contained within the draft gear pocket 10 and their longitudinal extent is only sufficient to enable them normally to contact or engage the front stop lugs 12.

Disposed and spaced substantially at right angles to the yoke arms 9, the arms 28 of the intermediate follower 24, as well as the latter's cross wall 23, preferably are interfitted with the yoke arms 9 so as to restrict transverse or lateral relative movement therebetween. This is accomplished in part by making the rear walls 21 and 23 of the yoke 2 and intermediate follower 24, respectively, of substantially the cross-section of the pocket 10, narrowing the arms 9 of the yoke 2 forwardly of its rear wall to provide them with coextensive, substantially parallel-sided, intermediate portions 29, slotting the intermediate follower's cross wall 23 intermediate its ends, as at 30, to receive the parallel-sided portion 29 of the yoke arms, and extending the follower arms 28 transversely, here vertically, so that they are coextensive in width with the cross wall 23 and transversely overlap and straddle or embrace the parallel-sided portions 29 of the yoke arms at the sides. If, in addition, the width of the slots 30 in the cross wall 23 of the intermediate follower 24 and the transverse spacing of its parallel arms 28 is made substantially equal to or the same as the width of the parallel-sided intermediate portions 29 of the yoke arms 21 and those portions are of a length sufficient to accommodate the range of relative longitudinal movement between the yoke 2 and the intermediate follower, the yoke and follower will so interfit as to cooperate in limiting their relative transverse and angling movements and guiding and centering each other on longitudinal movement of one or both in the draft gear pocket 10.

The arms 28 of the intermediate follower 24 not only embrace or straddle the intermediate portions 29 of the yoke arms 9, but include within their longitudinal extremities the front cushioning unit 17 and at least the rear portion or base 31 of the front follower or follower block 25. Accordingly, to prevent the spacing between the follower arms 28 from restricting the corresponding maximum dimension of the front cushioning unit 17 and front follower 25, the follower arms preferably are of loop form with each interrupted by one of a pair of transversely aligned side or transverse openings or apertures 32 of a length and width to accommodate or receive at the sides the front cushioning unit and the base of the front follower.

For full bearing with the front cushioning unit 17 the base 31 of the front follower 25 will project at the sides into the apertures 32 in the follower arms 28 and normally be spaced rearwardly of the rearwardly facing walls 33 on the arms bounding or defining the front ends or extremities of those apertures. With this exception the front follower 25 may vary in form depending on that of the associated coupler 3. Ordinarily, the front follower 25 will have a protuberance or boss 34 integral with, centered on and extending or projecting forwardly from its otherwise preferably substantially flat base 31 and will have a front face or wall 35 normally engaging a confronting rear surface 36 either formed on or movable longitudinally with the coupler 3. However, whether the front face 35 of the front follower 25 will be formed on its protuberance 34 or on a separate member will depend primarily on the mode of assembly of the front follower with the intermediate follower 24. The assembly of the front and intermediate followers 25 and 24 here contemplated in which the front follower is inserted from the side through one of the apertures 32 in the arms 28 of the intermediate follower, limits the longitudinal extent of the front follower to that of either aperture. Thus, to project the front face 35 to the point of engagement with the confronting rear surface 36 of the coupler 3, here a spherical surface on the universal block 5, the front face is formed in the illustrated embodiment on a bearing or buffing block 37 interposed between the coupler and the front follower. The illustrated bearing block 37 extends forwardly between the front stop lugs 12 and is carried by and removably mounted on and held against transverse and rotative movement relative to the front follower 25, conveniently by a flat-sided or otherwise out-of-round stem, stud or prong 38 integral with and centered on and projecting rearwardly from the bearing block and seating or received in a central socket or aperture 39 of corresponding configuration extending rearwardly into or through the front follower 25.

Held in the draft gear pocket 10 after installation by front and rear support plates 40 and 41 attached to and extending below the center sill 11 intermediate its sides 14 and with its several cushioning units arranged in tandem, the illustrated draft gear 1 under buffing forces uses all of its cushioning units in series, the coupler 3, since free to move rearwardly relative to the yoke 2, acting through the bearing block 37 on the front follower 25 and thereafter in sequence on the front cushioning unit 17, cross wall 23 of the intermediate follower 24, intermediate cushioning unit 16, rear wall 21 of the yoke and the rear cushioning unit 15, with any buffing forces unabsorbed by the cushioning units transmitted through the rear follower block 22 and rear stop lugs 13 to the center sill. In draft, the yoke is pulled by and moves forwardly in unison with the coupler and thus transmits draft forces from the coupler through the rear wall 21 and the intermediate cushioning unit 16 to the intermediate follower 24 and through the arms 28 of the latter to the front stop lugs 12 and the center sill 11. Thus, while appropriately, the potentially far greater forces in buff are cushioned by the full capacity of the gear, the lesser maximum draft forces are taken only by the intermediate cushioning unit 16. This does not necessarily mean that the ratio of the capacity in draft to the capacity in buff is the same as that of the number of rubber pads 18 in the intermediate cushioning unit 16 to the total number in the gear, since the relative ultimate capacity in draft and buff can be varied over a wide range by using in the intermediate cushioning unit rubber pads of different durometer hardness than those in either or both of the other cushioning units. The cushioning characteristics of the gear up to maximum capacity in both draft and buff also are variable over a wide range by adjusting the initial or precompression applied to each of the several cushioning units before or during installation.

The initial or precompression of the rear and intermediate cushioning units 15 and 16 desirably is such that in the normal or at rest position of the draft gear, the rear follower 22 and intermediate follower 24 will be pressed respectively against the rear stop lugs 13 and front stop lugs 12 and that the rear cushioning unit will continue to apply a force holding the rear follower in contact with the rear stop lugs over the range of forward as well as rearward movement of the yoke in the center sill 11. This not only enables the draft gear automatically to take up any slack due to wear between the stop lugs 12 and 13 and intermediate and rear followers 24 and 22, but also holds the rear wall 21 of the yoke 2 under restraint at all times between the intermediate and rear cushioning units, one expanding as the other is compressed, so that the yoke as a whole is constantly under restraint and prevented from rattling back and forth or sideways within the center sill.

In the case of the front cushioning unit 17, its initial or precompression, while increasing its resistance to compression and correspondingly improving the operating characteristics of the gear in buff, is mainly responsible for taking up any slack due to wear between the face 35 of the front follower 25 and confronting surface 36 of the coupler 3. The front cushioning unit, by expanding, takes up any such slack automatically to the extent of the initial rearward spacing of the base 31 of the front follower from the connecting webs 42 on the follower's arms 28 at the front of the apertures 32. The result initially of the balance between the force of the intermediate cushion 16 tending to move the yoke rearwardly and the front cushion 17 tending to move the coupler forwardly, the spacing between the base 31 of the front follower and the connecting web or front portions 42 of the arms 28 carrying the rearwardly facing walls 33 is maintained, except to the extent temporarily taken up by forward movement of the coupler under draft forces or permanently taken up by wear, rearward movement of the coupler in buff increasing rather than decreasing this spacing since the arms of the intermediate follower are disengaged from the front stop lugs 12 only by pressure exerted on the intermediate follower through the front follower and the front cushioning unit.

From the above detailed description, it will be apparent that there has been provided an improved rubber draft gear which may have greater ultimate capacity in buff than draft, restrains its yoke at all times against rattling and automatically compensates for any slack due to wear in its connections to the associated coupler and center sill. It should be understood that the described and disclosed embodiment is merely exemplary of the invention and that all modifications are intended to be included which do not depart from either the spirit of the invention or the scope of the appended claims.

What is claimed is:

1. A rubber draft gear installable in a draft gear pocket between front and rear stop lugs for cushioning buffing and draft forces of a coupler, comprising a yoke connectable for forward and relative rearward movement to said coupler, intermediate and rear followers normally engageable respectively with said front and rear stop lugs, an intermediate rubber cushioning unit interposed and acting between said intermediate follower and a rear wall of said yoke, a rear rubber cushioning unit interposed and acting between said rear wall and rear follower, a front follower movable longitudinally relative to said yoke and intermediate follower and carrying means engageable with said coupler, and a front rubber cushioning unit interposed and acting between said front and intermediate followers for normally urging said front follower into engagement with said coupler, said several cushioning units cooperating to cushion buffing forces and said rear cushioning unit being inoperative to cushion draft forces.

2. A rubber draft gear installable in a draft gear pocket between front and rear stop lugs for cushioning buffing and draft forces of a coupler, comprising a yoke connectable to said coupler, intermediate and rear followers normally engageable respectively with said front and rear stop lugs, an intermediate rubber cushioning unit interposed and acting between said intermediate follower and a rear wall of said yoke, a rear rubber cushioning unit interposed and acting between said rear wall and rear follower, a front follower movable longitudinally relative to said yoke and intermediate follower and carrying means engageable with said coupler, and a front rubber cushioning unit interposed and acting between said front and intermediate followers for normally urging said front follower into engagement with said coupler, said several cushioning units being precompressed and expandable to take up slack within said draft gear and between said draft gear and stop lugs and coupler.

3. A rubber draft gear installable in a draft gear pocket between front and rear stop lugs for cushioning buffing and draft forces of a coupler, comprising a yoke having a rear wall and connectable to said coupler, a rear rubber cushioning unit rearwardly of and acting against said rear wall of said yoke, a plurality of rubber cushioning units in said yoke in tandem with each other and said rear cushioning unit, a front follower movable longitudinally in said yoke forwardly of said plurality of units and carrying means engageable with said coupler, and a follower member movable longitudinally in said yoke between said plurality of units and normally engaging said front stop lugs, said several cushioning units being precompressed and expandable to take up any slack within said gear and between said gear and said stop lugs and coupler.

4. A rubber draft gear installable in a draft gear pocket between front and rear stop lugs for cushioning buffing and draft forces of a coupler, comprising a yoke having a rear wall and a pair of transversely spaced arms projecting forwardly therefrom and connected to said coupler, a rear rubber cushioning unit interposed and acting between said rear wall and rear stop lugs, an intermediate follower having a cross wall straddled by said arms and transversely spaced arms projecting forwardly from said cross wall and normally engageable with said front stop lugs, an intermediate rubber cushioning unit acting between and longitudinally spacing said rear and cross walls, a front follower between said first-named arms forwardly of said cross wall and having a base projecting at sides into and normally spaced rearwardly of forward extremities of transverse openings in said second-named arms, and a front rubber cushioning unit interposed and acting between said cross wall and said base for urging said carried means into engagement with said coupler, said several rubber cushioning units being precompressed and expandable to take up slack within said gear and between said gear and said stop lugs and coupler.

5. A rubber draft gear installable in a draft gear pocket between front and rear stop lugs for cushioning buffing and draft forces of a coupler, comprising a yoke having a rear wall and a pair of transversely spaced arms projecting forwardly therefrom and connected for relative rearward movement to said coupler, a rear rubber cushioning unit interposed and acting between said rear wall and rear stop lugs, an intermediate follower having a cross wall straddled by said arms and transversely spaced arms projecting forwardly from said cross wall and normally engageable with said front stop lugs, an intermediate rubber cushioning unit acting between and longitudinally spacing said rear and cross walls, a front follower between said first-named arms forwardly of said cross wall and having a base projecting at sides into and normally spaced rearwardly of forward extremities of transverse openings in said second-named arms, and a front rubber cushioning unit interposed and acting between said cross wall and said base for urging said carried means into engagement with said coupler, said several rubber cushioning units being precompressed and expandable to take up slack within said gear and between said gear and said stop lugs and coupler, and said several cushioning units coacting to cushion buffing forces and only said intermediate unit acting to cushion draft forces.

6. A rubber draft gear installable in a draft gear pocket between front and rear stop lugs for cushioning buffing and draft forces of a coupler, comprising a yoke having a rear wall and a pair of transversely spaced arms projecting forwardly therefrom and connected to said coupler, a rear rubber cushioning unit interposed and acting between said rear wall and rear stop lugs, an intermediate follower having a cross wall straddled by said arms and transversely spaced arms projecting forwardly from said cross wall and normally engageable with said front stop lugs, an intermediate rubber cushioning unit acting between and longitudinally spacing said rear and cross walls, a front follower between said first-named arms forwardly of said cross wall and having a base projecting at sides into and normally spaced rearwardly of forward extremities of transverse openings in said second-named arms, bearing means carried by said front follower and projecting forwardly of said base thereof for engagement with said coupler, and a front rubber cushioning unit interposed and acting between said cross wall and said base for urging said bearing means into engagement with said coupler, said several rubber cushioning units being precompressed and expandable to take up slack within said gear and between said gear and said stop lugs and coupler.

7. A rubber draft gear installable in a draft gear pocket between front and rear stop lugs for cushioning buffing and draft forces of a coupler, comprising a yoke having a rear wall and a pair of transversely spaced arms projecting forwardly therefrom and connected for forward and relative rearward movement to said coupler, a rear rubber cushioning unit interposed and acting between said rear wall and rear stop lugs, an intermediate follower having a cross wall straddled by said arms and transversely spaced arms projecting forwardly from said cross wall and normally engageable with said front stop lugs, an intermediate rubber cushioning unit acting between and longitudinally spacing said rear and cross walls, a front follower between said first-named arms forwardly of said cross wall and having a base projecting at sides into and normally spaced rearwardly of forward extremities of transverse openings in said second-named arms, a bearing block carried by said front follower and projecting forwardly of said base thereof for engagement with said coupler, and a front rubber cushioning unit interposed and acting between said cross wall and said base for urging said bearing block into engagement with said coupler, said several rubber cushioning units being precompressed and expandable to take up slack within said gear and between said gear and said stop lugs and coupler.

8. A rubber draft gear installable in a draft gear pocket between front and rear stop lugs for cushioning buffing and draft forces of a coupler, comprising a yoke having a rear wall and a pair of transversely spaced arms projecting forwardly therefrom and connected for forward and relative rearward movement to said coupler, a rear rubber cushioning unit interposed and acting between said rear wall and rear stop lugs, an intermediate follower having a cross wall straddled by said arms and transversely spaced arms projecting forwardly from said cross wall and normally engageable with said front stop lugs, transverse openings in said arms and bounded forwardly by transverse web portions thereof, an intermediate rubber cushioning unit interposed and acting between said rear and cross walls, a front follower insertable from a side between said second-named arms through one of said openings and having portions projecting thereinto and normally spaced rearwardly from said web portions, a bearing block carried by said front follower forwardly of said projecting portions and engageable with said coupler, and a front rubber cushioning unit interposed and acting between said cross wall and said base for urging said bearing block into engagement with said coupler, said several rubber cushioning units being precompressed and expandable to take up slack within said gear and between said gear and said stop lugs and coupler.

9. A rubber draft gear installable in a draft gear pocket between front and rear stop lugs for cushioning buffing and draft forces of a coupler, comprising a yoke having a rear wall and a pair of transversely spaced arms projecting forwardly therefrom and connected for forward and relative rearward movement to said coupler, a rear rubber cushioning unit interposed and acting between said rear wall and rear stop lugs, an intermediate follower having a cross wall straddled by said arms and transversely spaced arms projecting forwardly from said cross wall and normally engageable with said front stop lugs, an intermediate rubber cushioning unit acting between and longitudinally spacing said rear and cross walls, a front follower between said first-named arms forwardly of said cross wall and having a base projecting at sides into and normally spaced rearwardly of forward extremities of transverse openings in said second-named arms, a bearing block extending forwardly of said front follower and having an out-of-round rearwardly projecting stem received in a socket of corresponding section in said front follower for supporting said block against relative rotative movement thereon, and a front rubber cushioning unit interposed and acting between said cross wall and said base for urging said bearing block into engagement with said coupler, said several rubber cushioning units being precompressed and expandable to take up slack within said gear and between said gear and said stop lugs and coupler.

10. A rubber draft gear installable in a draft gear pocket between front and rear stop lugs for cushioning buffing and draft forces of a coupler, comprising a yoke having a rear wall and a pair of transversely spaced arms projecting forwardly therefrom and connected for forward and relative rearward movement to said coupler, a rear rubber cushioning unit interposed and acting between said rear wall and rear stop lugs, an intermediate follower having a cross wall and a pair of transversely spaced arms projecting forwardly therefrom and normally engageable with said front stop lugs, said cross wall extending between and being embraced by and said second-named arms embracing at sides said yoke arms for permitting longitudinal while limiting transverse movement between said yoke and intermediate follower, an intermediate rubber cushioning unit acting between and longitudinally spacing said rear and cross walls, a front follower between said first-named arms forwardly of said cross wall and having a base projecting at sides into and normally spaced rearwardly of forward extremities of transverse openings in said second-named arms, and a front rubber cushioning unit interposed and acting between said cross wall and said base for urging said carried means into engagement with said coupler, said several rubber cushioning units being precompressed and expandable to take up slack within said gear and between said gear and said stop lugs and coupler.

11. A rubber draft gear installable in a draft gear pocket between front and rear stop lugs for cushioning buffing and draft forces of a coupler comprising a yoke having a rear wall and a pair of transversely spaced arms projecting forwardly therefrom and connected for forward and relative rearward movement to said coupler, a rear rubber cushioning unit interposed and acting between said rear wall and rear stop lugs, an intermediate follower having a cross wall extending between and slotted to receive parallel-sided intermediate portions of said yoke arms, a pair of transversely spaced arms on and projecting forwardly of said cross wall of said intermediate follower and normally engaging said front stop lugs, said second-named arms having substantially parallel confronting faces substantially equal in spacing to the width of and embracing at sides said parallel-sided portions of said yoke for limiting relative transverse and angling movements between said yoke and intermediate follower, an intermediate rubber cushioning unit acting between and longitudinally spacing said rear and cross walls, a front follower between said first-named arms forwardly of said cross wall and having a base projecting at sides into and normally spaced rearwardly of forward extremities of transverse openings in said second-named arms, and a front rubber cushioning unit interposed and acting between said cross wall and said base for urging said carried means into engagement with said coupler, said several rubber cushioning units being precompressed and expandible to take up slack within said gear and between said gear and said stop lugs and coupler.

12. A draft gear installable in a draft gear pocket between front and rear stop lugs for cushioning buffing and draft forces of a coupler, comprising a yoke having a rear wall and a pair of transversely spaced arm projecting forwardly therefrom and each having a rearwardly enlongated slot for pin and slot connection for forward and relative rearward movement to said coupler, a rear rubber cushioning unit interposed and acting between said rear wall and rear stop lugs, an intermediate follower having a cross wall straddled by said arms and transversely spaced arms projecting forwardly from said cross wall and normally engageable with said front stop lugs, an intermediate rubber cushioning unit acting between and longitudinally spacing said rear and cross walls, a front follower between said first-named arms forwardly of said cross wall and having a base projecting at sides into and normally spaced rearwardly of forward extremities of transverse openings in said second-named arms, and a front rubber cushioning unit interposed and acting between said cross wall and said base for urging said carried means into engagement with said coupler, said several rubber cushioning units being precompressed and expandable to take up slack within said gear and between said gear and said stop lugs and coupler, and said several cushioning units coacting to cushion buffing forces and only said intermediate unit acting to cushion draft forces.

References Cited in the file of this patent

UNITED STATES PATENTS

| | | |
|---|---|---|
| 2,186,267 | Page | Jan. 9, 1940 |
| 2,635,766 | Willison | Apr. 21, 1953 |
| 2,776,057 | Blattner | Jan. 1, 1957 |